United States Patent [19]
Raoult

[11] Patent Number: 5,613,618
[45] Date of Patent: Mar. 25, 1997

[54] COOKING VESSEL WITH LID HAVING A POURER FUNCTION

[75] Inventor: Philippe Raoult, Pringy, France

[73] Assignee: SEB S.A., Ecully, France

[21] Appl. No.: 632,389

[22] Filed: Apr. 10, 1996

[30] Foreign Application Priority Data

Apr. 11, 1995 [FR] France .................... 95 04322

[51] Int. Cl.⁶ .............. A47J 27/00; A47J 36/08; B65D 51/02; B65D 51/16
[52] U.S. Cl. .............. 220/369; 99/403; 99/410; 220/287; 220/366.1; 220/912; D7/391; D7/538
[58] Field of Search .............. 99/403, 410, 339, 99/340; 126/369, 389, 384; 220/287, 366.1, 367.1, 369, 373, 912; D7/391, 538; 210/444–469

[56] References Cited

U.S. PATENT DOCUMENTS

| | | | |
|---|---|---|---|
| 656,855 | 8/1900 | Pimlott | 220/287 |
| 909,284 | 1/1909 | Colling | 220/287 X |
| 1,623,397 | 4/1927 | Dunlap | 210/465 |
| 2,760,672 | 8/1956 | Cronheim | 220/369 |
| 2,907,467 | 10/1959 | Machate, Jr. | |
| 3,102,661 | 9/1963 | Lundquist | 220/367.1 |
| 3,598,105 | 8/1971 | Cristaldi | 220/369 |
| 4,512,497 | 4/1985 | Grusin | 126/389 X |
| 4,590,919 | 5/1986 | Spani et al. | 126/382 |
| 4,828,140 | 5/1989 | Henderson | 220/373 X |
| 4,989,748 | 2/1991 | Parr, Jr. et al. | 220/369 |
| 5,065,889 | 11/1991 | Conti | 220/912 X |
| 5,531,254 | 7/1996 | Uy | 99/645 |
| 5,555,994 | 9/1996 | Chen | 99/426 |

FOREIGN PATENT DOCUMENTS

| | | |
|---|---|---|
| 847340 | 8/1952 | Germany . |
| 8814181 | 1/1989 | Germany . |
| WO93/20738 | 10/1993 | WIPO . |

*Primary Examiner*—Timothy F. Simone
*Attorney, Agent, or Firm*—Young & Thompson

[57] ABSTRACT

A cooking vessel has a handle or handles for holding it and a lid having a peripheral lip resting in a substantially sealed manner on an upper rim of the vessel. An inside surface of the lid includes at least one cavity formed between the peripheral lip and an abutment projecting towards the interior of the vessel. The lid moves under gravity on the upper rim of the vessel, upon tilting of the vessel, towards a position in which the cavity is at least in part outside the upper rim of the vessel. A passage is formed between the upper rim of the vessel and the cavity. The abutment bears against the upper rim of the vessel to limit outward displacement of the lid.

10 Claims, 2 Drawing Sheets

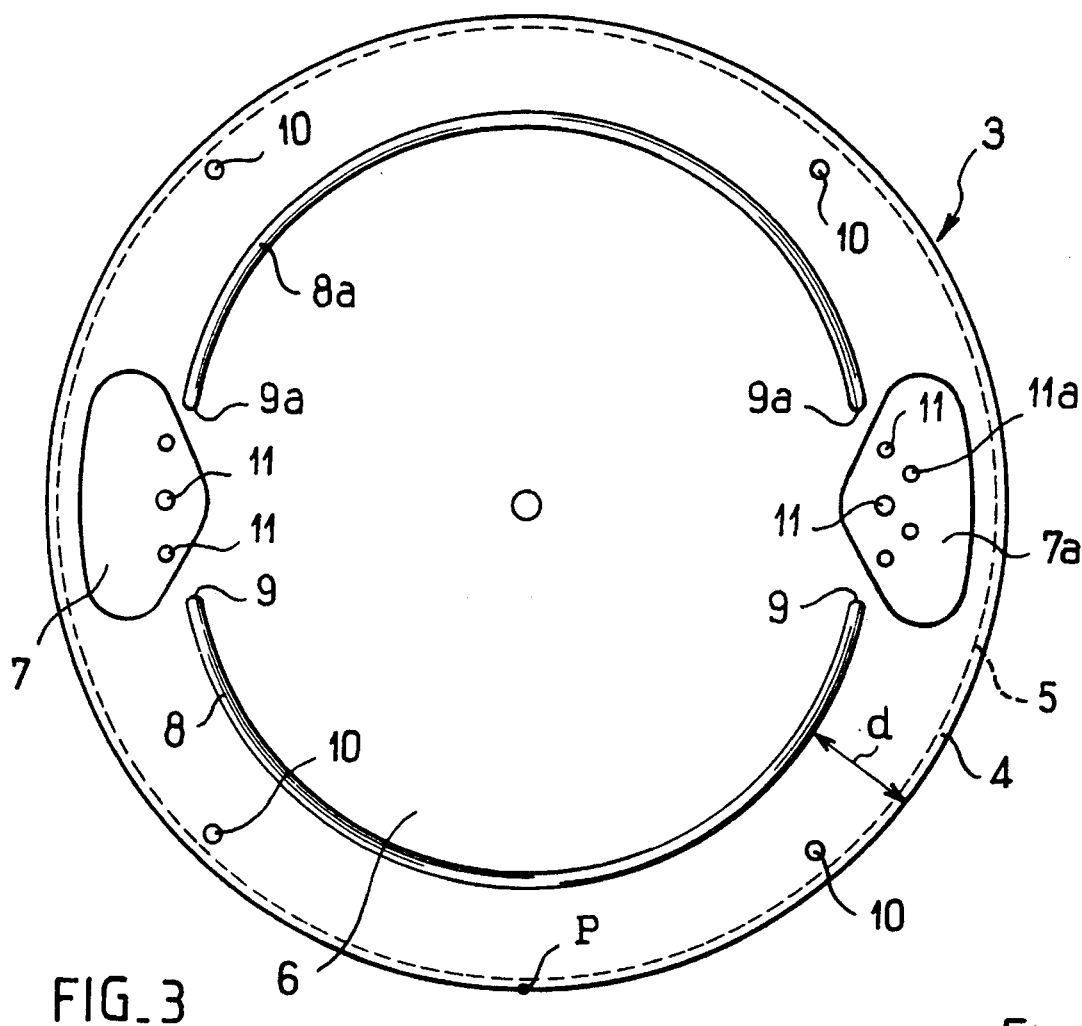
FIG_3
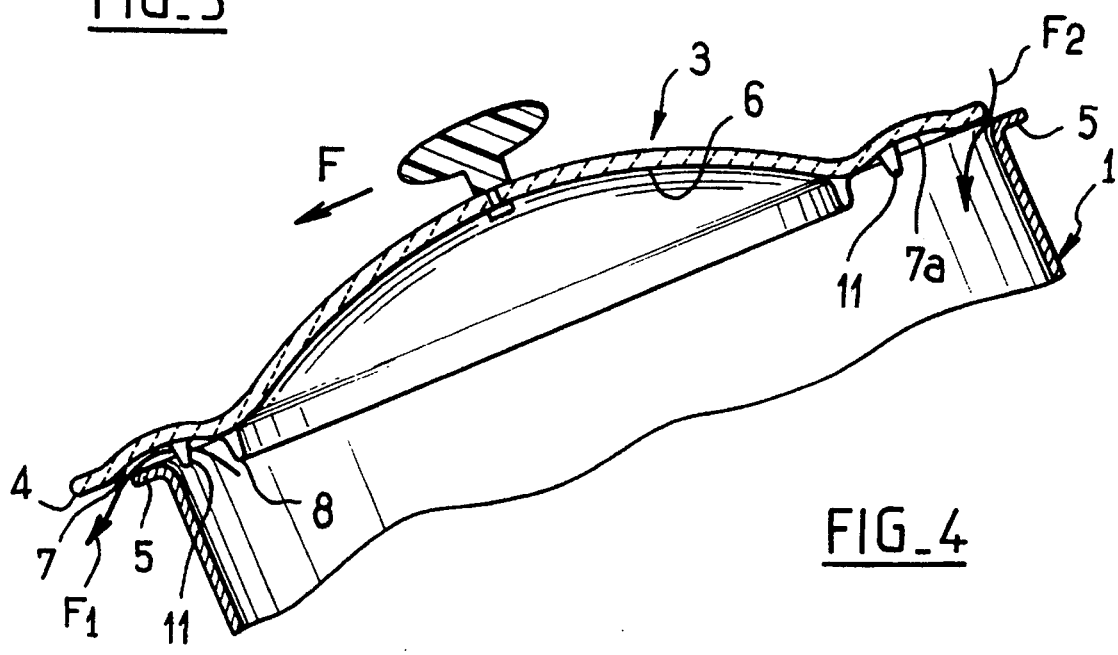
FIG_4

COOKING VESSEL WITH LID HAVING A POURER FUNCTION

BACKGROUND OF THE INVENTION

1. Field of the Invention

The present invention concerns a cooking vessel having a handle or handles for holding it and a lid having a peripheral lip resting in a substantially sealed manner on the upper rim of the vessel.

The invention is aimed in particular at saucepans and general purpose cooking vessels for heating a liquid containing foods such as rice, pasta, vegetables, etc.

2. Description of the Prior Art

During cooking, the peripheral lip rests in a substantially sealed manner on the upper rim of the vessel. When cooking is finished the liquid (usually water) is poured out.

To this end, the vessel is tilted and the lid is raised slightly in a direction opposite to the inclination of the vessel, i.e. against the direction in which the lid would move due to its own weight, to cause a small opening to appear between the lid and the rim of the vessel, sufficient for the liquid to flow through but preventing the foods passing through.

This procedure is not very convenient, requires some degree of skill and does not provide an efficient way of filtering the foods.

An aim of the present invention is to remedy these drawbacks.

SUMMARY OF THE INVENTION

The invention therefore consists in a cooking vessel having a handle or handles for holding it and a lid having a peripheral lip resting in a substantially sealed manner on an upper rim of said vessel, wherein an inside surface of said lid includes at least one cavity formed between said peripheral lip and an abutment projecting towards the interior of said vessel, said lid being adapted to move under gravity on said upper rim of said vessel, upon tilting of said vessel, towards a position in which said cavity is at least in part outside said upper rim of said vessel, a passage being formed between said upper rim of said vessel and said cavity, and said abutment is adapted to bear against said upper rim of said vessel to limit outward displacement of said lid.

Accordingly, on tilting the vessel, the lid moves under its own weight in the direction of tilting so that the cavity formed on the internal surface of the lid creates an opening for the liquid to pass through between the upper rim of the vessel and the lid, the abutment also formed on the interior surface of the lid limiting the displacement of the latter.

The cavity produces an opening of predetermined size that is optimal for pouring.

Because of the movement induced by gravity, another opening is caused to appear on the opposite side to said cavity between the lid and the rim of the vessel, enabling air to enter the vessel to facilitate the flow of the liquid.

In a preferred embodiment the internal surface of the lid comprises two diametrically opposed cavities at substantially 90° from the handle or from each handle of the vessel.

The two cavities enable pouring with two different and opposite inclinations of the vessel.

The cavity or each cavity preferably has a back wall with a curved profile.

This curved profile of the cavity or cavities enables the liquid to flow under optimal conditions.

According to another specific feature of the invention the cavity or each cavity includes a series of pins projecting towards the interior of the vessel and providing a filter function.

During pouring, these pins hold back the passage of foods such as rice, pasta, vegetables, etc. The distance between the pins can be adjusted to suit the dimensions of the foods.

Other features and advantages of the invention will emerge further from the following description and the appended drawings given by way of non-limiting example.

BRIEF DESCRIPTION OF THE DRAWINGS

FIG. 3 is a plan view of the inside surface of the lid.

FIG. 4 is a view analogous to FIG. 2 showing the vessel tilted and the lid shifted in the direction of gravity.

DETAILED DESCRIPTION OF THE PREFERRED EMBODIMENT

Figure 1:
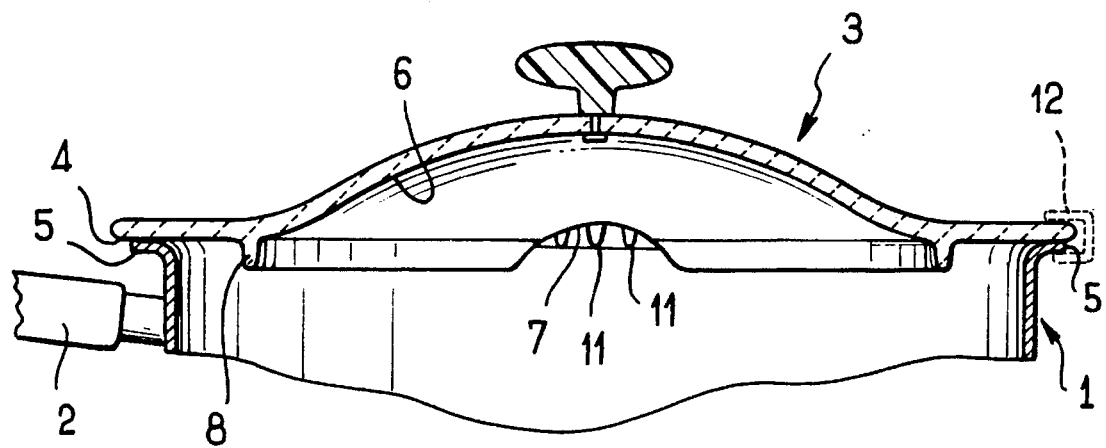
FIG. 1 is a part-sectional view of a vessel in accordance with the invention and its lid in position on the upper rim of the vessel.

The cooking vessel 1 shown in FIG. 1 has a handle 2 and a lid 3 with a peripheral lip 4 resting in a substantially sealed way on the upper rim 5 of the vessel 1.

In accordance with the invention, the inside surface 6 of the lid 3 includes at least one cavity 7 between the peripheral lip 4 and an abutment 8 projecting towards the interior of the vessel (see FIGS. 1, 2, 3 and 4). As indicated in FIG. 4, the lid 3 can move under gravity on the upper rim 5 of the vessel 1, when the latter is tilted, towards a position in which the cavity 7 is at least partly outside the upper rim 5 of the vessel 1 with the abutment 8 bearing against the inside wall 5 of the vessel 1 to limit outward movement of the lid 3.

In the example shown in the appended figures the inside surface 6 of the lid 3 has two diametrically opposite cavities 7, 7a at substantially 90° from the handle 2.

Figure 2:
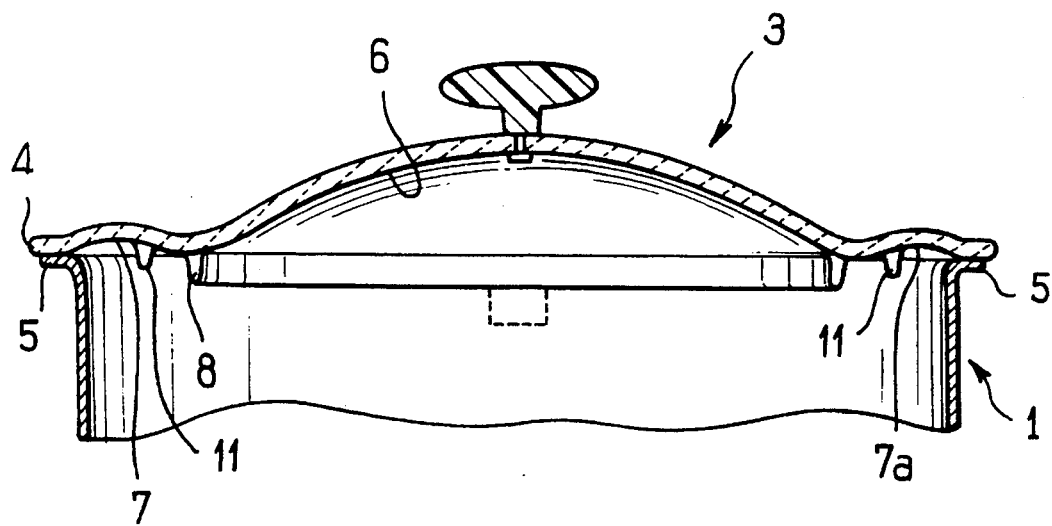
FIG. 2 is a view similar to FIG. 1 with the section plane at 90° to that of FIG. 1.

FIGS. 2 and 4 additionally show that the cavities 7, 7a have a back wall with a curved profile.

FIG. 3 shows that the abutment 8 is formed of two projections 8, 8a of symmetrical arcuate shape relative to the two diametrically opposite cavities 7, 7a. The ends 9, 9a of the two projections are on opposite sides of each cavity 7, 7a with the result that the abutments 8, 8a are interrupted in line with the cavities 7, 7a.

FIG. 3 additionally shows that the distance d between each projection 8, 8a and the outside edge 4 of the lid progressively increases between a position P at 90° from each cavity 7, 7a and a position 9, 9a near each cavity 7, 7a. This arrangement enables a greater displacement of the lid 3 in the direction of the cavities 7, 7a.

As shown in FIG. 3, the lid 3 has on its inside surface 6 near its outside edge 4 pins 10 projecting towards the interior and cooperating with the upper rim 5 (shown in dashed line in FIG. 3) of the vessel 1 to center the lid 3 relative to the upper rim 5.

The cavities 7, 7a contain a series of pins 11, 11a projecting towards the interior of the vessel and acting as a filter during pouring.

In the example shown the two diametrically opposite cavities 7, 7a contain pins 11, 11a with respective different locations and dimensions, enabling foods of different sizes to be filtered.

In the example shown the lid 3 is molded from glass or from plastics material.

The cavities 7, 7a, abutments 8, 8a and pins 10, 11, 11a are formed when the lid 3 is molded.

The lid can instead be of pressed metal, of course. In this case, the cavities, abutments and pins referred to above are formed during pressing of the lid or by attaching an additional metal or plastics material part.

The saucepan just described is used in the following manner.

During cooking the lid 3 is perfectly centered on the rim 5 of the vessel 1 by the pins 10 and 11 and rests in a substantially sealed manner on the rim 5, as shown in FIGS. 1 and 2.

To pour out the liquid contained in the saucepan it is tilted as shown in FIG. 4, the user holding the handle 2 in one hand. With their other hand the user pushes the lid 3 in the direction F of gravity. During this movement of the lid 3 the two centering pins 10 nearest the cavity 7 pass over the rim 5 of the vessel 1.

The cavity 7 then straddles the rim 5 of the vessel, which creates an opening (see arrow F1) between the rim 5 of the vessel and the lid, enabling the liquid to flow out. Another opening (see arrow F2) is formed opposite the cavity 7 enabling air to enter the container to facilitate the flow of the liquid.

Greater displacement of the lid 3 in the direction of gravity is prevented by the abutments 8, 8a.

The pins 11, 11a act as a filter. In the example shown in FIG. 3, a greater degree of filtering (suitable for smaller foods) is obtained when the saucepan is tilted in the direction of the cavity 7a, because the pins 11, 11a in the latter are closer together and greater in number than those in the cavity 7.

The displacement of the lid 3 when the saucepan is tilted could be guided by a flange 12 (shown in dashed line in FIG. 1) formed on the edge of the lid 3 opposite the handle 2 and engaging under the rim 5 of the vessel. In this case the user would be able to pour with one hand, without needing to hold the lid 3.

There is claimed:

1. Cooking vessel having a handle or handles for holding it and a lid having a peripheral lip resting in a substantially sealed manner on an upper rim of said vessel, wherein an inside surface of said lid includes at least one cavity formed between said peripheral lip and an abutment projecting towards the interior of said vessel, said lid being adapted to move under gravity on said upper rim of said vessel, upon tilting of said vessel, towards a position in which said cavity is at least in part outside said upper rim of said vessel, a passage being formed between said upper rim of said vessel and said cavity, and said abutment is adapted to bear against said upper rim of said vessel to limit outward displacement of said lid.

2. Vessel according to claim 1 wherein said inside surface of said lid includes two diametrically opposite cavities disposed at substantially 90° to said handle or to each of said handles.

3. Vessel according to claim 1 wherein said cavity or each of said cavities has a back wall with a curved profile.

4. Vessel according to claim 2 wherein said abutment comprises two projections of symmetrical arcuate shape relative to said two diametrically opposite cavities, respective ends of said two projections being disposed on opposite sides of each cavity.

5. Vessel according to claim 4 wherein the distance between each projection and said outside edge of said lid increases progressively between a position at 90° from each cavity and a position near each cavity.

6. Vessel according to claim 1 wherein said lid has on its inside surface near its outside edge pins projecting towards the interior and adapted to cooperate with said upper rim of said vessel to center said lid relative to said upper rim.

7. Vessel according to claim 1 wherein said cavity or each cavity includes a series of pins projecting towards the interior of said vessel and acting as filters.

8. Vessel according to claim 2 wherein said two diametrically opposite cavities contain pins the spacing of which is different in each cavity.

9. Vessel according to claim 1 wherein said lid is molded from glass or from plastics material and said cavity or said cavities, said abutments and/or said pins are formed during molding of said lid.

10. Vessel according to claim 1 wherein said lid is of pressed metal and said cavity or cavities, said abutments and/or said pins are formed during pressing of said lid.

* * * * *